(12) United States Patent
Numata et al.

(10) Patent No.: US 11,070,252 B2
(45) Date of Patent: Jul. 20, 2021

(54) CIRCUIT MODULE, BICYCLE ELECTRIC COMPONENT, AND COMMUNICATION SYSTEM

(71) Applicant: Shimano Inc., Sakai (JP)

(72) Inventors: Fumihide Numata, Sakai (JP); Takafumi Suzuki, Sakai (JP); Mao Kuroda, Sakai (JP); Yuichiro Ishikawa, Sakai (JP)

(73) Assignee: Shimano Inc., Sakai (JP)

( * ) Notice: Subject to any disclaimer, the term of this patent is extended or adjusted under 35 U.S.C. 154(b) by 240 days.

(21) Appl. No.: 16/135,888

(22) Filed: Sep. 19, 2018

(65) Prior Publication Data

US 2019/0103895 A1 Apr. 4, 2019

(30) Foreign Application Priority Data

Sep. 29, 2017 (JP) .............................. JP2017-189699

(51) Int. Cl.

| | |
|---|---|
| *B62J 6/00* | (2020.01) |
| *H04B 3/56* | (2006.01) |
| *B62J 99/00* | (2020.01) |
| *B62M 6/45* | (2010.01) |
| *B62M 6/90* | (2010.01) |
| *B62J 45/00* | (2020.02) |
| *B62J 45/20* | (2020.02) |
| *B62J 50/21* | (2020.02) |

(52) U.S. Cl.
CPC .............. *H04B 3/56* (2013.01); *B62J 99/00* (2013.01); *B62M 6/45* (2013.01); *B62M 6/90* (2013.01); *B62J 45/00* (2020.02); *B62J 45/20* (2020.02); *B62J 50/225* (2020.02); *H04B 2203/5408* (2013.01); *H04B 2203/5441* (2013.01)

(58) Field of Classification Search
CPC ........................................................ H04B 3/56
USPC ...... 340/432, 636.1, 636.12, 636.19; 180/220
See application file for complete search history.

(56) References Cited

U.S. PATENT DOCUMENTS

| | | | |
|---|---|---|---|
| 2007/0167144 A1 | 7/2007 | Koga et al. | |
| 2011/0267178 A1 | 11/2011 | Nishihara et al. | |
| 2012/0253600 A1* | 10/2012 | Ichida | B62K 19/36 701/37 |

(Continued)

FOREIGN PATENT DOCUMENTS

| | | |
|---|---|---|
| CN | 101193173 A | 6/2008 |
| CN | 101982027 A | 2/2011 |

(Continued)

*Primary Examiner* — Tai T Nguyen
(74) *Attorney, Agent, or Firm* — Alleman Hall Creasman & Tuttle LLP

(57) ABSTRACT

To provide a circuit module, a bicycle electric component, and a communication system that are easily matched to a communication system that uses power line communication, a circuit module is configured to be mounted on a bicycle electric component. The circuit module includes a first circuit board, a communication converter configured to convert between information appropriate to power line communication and information appropriate to communication other than the power line communication and mounted on the first circuit board, and a plurality of first terminals formed on the first circuit board. The plurality of first terminals is connected to a second circuit board included in the electric component.

23 Claims, 5 Drawing Sheets

(56) References Cited

U.S. PATENT DOCUMENTS

| | | | |
|---|---|---|---|
| 2013/0188673 A1 | 7/2013 | Sun et al. | |
| 2013/0334874 A1* | 12/2013 | Shirai | B62M 25/08 307/9.1 |
| 2014/0298943 A1 | 10/2014 | Hashimoto | |
| 2015/0210354 A1* | 7/2015 | Kuroda | B62M 9/12 474/70 |
| 2015/0352973 A1* | 12/2015 | Gao | B60L 58/12 318/139 |
| 2016/0311500 A1* | 10/2016 | Kasai | B62M 6/45 |
| 2018/0208269 A1* | 7/2018 | Nose | B62M 9/122 |
| 2018/0276980 A1* | 9/2018 | Yukizane | G08B 25/06 |
| 2018/0281896 A1* | 10/2018 | Takeshita | B62J 99/00 |

FOREIGN PATENT DOCUMENTS

| | | | |
|---|---|---|---|
| CN | 102233940 A | 11/2011 | |
| CN | 102897279 A | 1/2013 | |
| DE | 102016002300 A1 | 9/2016 | |
| JP | H06224300 A | 8/1994 | |
| JP | 2006339821 A | 12/2006 | |
| JP | 5211102 B2 | 6/2013 | |
| JP | 5489342 B2 | 5/2014 | |
| JP | 2016088205 A | 5/2016 | |

\* cited by examiner

CIRCUIT MODULE, BICYCLE ELECTRIC COMPONENT, AND COMMUNICATION SYSTEM

BACKGROUND ART

The present invention relates to a circuit module, a bicycle electric component, and a communication system.

Electric components mounted on a bicycle exchange information with each other, for example, through wireless serial communication. Electric components such as a battery, a cycle computer, and a drive unit may be connected through wired power line communication. Patent document 1 discloses one example of a prior art bicycle communication system.

Patent Document 1: Japanese Laid-Open Patent Publication No. 2016-88205

SUMMARY OF THE INVENTION

Electric components may use different standards of serial communication protocols. In this case, the communication protocols need to be matched for communication between the electric components communicate. The matching task is complicated.

One object of the present invention is to provide a circuit module, a bicycle electric component, and a communication system that are easily matched to a communication system that uses power line communication.

A first aspect of the present invention is a circuit module configured to be mounted on a bicycle electric component. The circuit module includes a first circuit board, a communication converter configured to convert between information appropriate to power line communication and information appropriate to communication other than the power line communication and mounted on the first circuit board, and a plurality of first terminals formed on the first circuit board. The plurality of first terminals is connected to a second circuit board included in the electric component.

In accordance with the first aspect, the bicycle electric component is easily matched to a communication system that uses power line communication.

In accordance with a second aspect of the present invention, the circuit module according to the first aspect further includes an electronic part mounted on the first circuit board and different from the communication converter.

In accordance with the second aspect, the communication converter and an electronic part needed for the communication converter to function can be arranged in one package. This facilitates the handling and mounting of the circuit module.

In accordance with a third aspect of the present invention, the circuit module according to the second aspect is configured so that the electronic part different from the communication converter includes a crystal oscillator circuit that drives the communication converter.

In accordance with the third aspect, the communication converter and the crystal oscillator circuit, serving as an electronic part needed for the communication converter to function, can be arranged in one package. This facilitates the handling and mounting of the circuit module.

In accordance with a fourth aspect of the present invention, the circuit module according to the second or third aspect is configured so that the electronic part different from the communication converter includes a filter circuit. The filter circuit removes a noise from a signal that is input to the circuit module and sends the signal, from which the noise is removed, to the communication converter.

In accordance with the fourth aspect, the communication converter and the filter circuit, serving as an electronic part needed for the communication converter to function, can be arranged in one package. This facilitates the handling and mounting of the circuit module.

In accordance with a fifth aspect of the present invention, the circuit module according to any one of the second to fourth aspects is configured so that the electronic part different from the communication converter includes a pull-up resistor connected to the communication converter.

In accordance with the fifth aspect, the communication converter and the pull-up resistor, serving as an electronic part needed for the communication converter to function, can be arranged in one package. This facilitates the handling and mounting of the circuit module.

In accordance with a sixth aspect of the present invention, the circuit module according to any one of the second to fifth aspects is configured so that the electronic part different from the communication converter includes a bypass capacitor connected to the communication converter.

In accordance with the sixth aspect, the communication converter and the bypass capacitor, serving as an electronic part needed for the communication converter to function, can be arranged in one package. This facilitates the handling and mounting of the circuit module.

In accordance with a seventh aspect of the present invention, the circuit module according to any one of the second to sixth aspects is configured so that the first circuit board includes a first region where the communication converter is mounted and a second region where the electronic part different from the communication converter is mounted.

In accordance with the seventh aspect, the communication converter and an electronic part needed for the communication converter to function are mounted on the first circuit board. Thus, the communication converter and the electronic part needed for the communication converter to function can be arranged in one package. This facilitates the handling and mounting of the circuit module.

In accordance with an eighth aspect of the present invention, the circuit module according to the seventh aspect is configured so that the second region is greater in area than the first region.

In accordance with the eighth aspect, an electronic part needed for the communication converter to function is mounted in a large area. Thus, a plurality of electronic parts can be mounted.

In accordance with a ninth aspect of the present invention, the circuit module according to any one of the first to eighth aspects is configured so that the first circuit board is connected to the second circuit board by the plurality of first terminals.

In accordance with the ninth aspect, the bicycle electric component is easily matched to a communication system that uses power line communication.

In accordance with a tenth aspect of the present invention, the circuit module according to any one of the first to ninth aspects is configured so that the communication converter is operated by a supply of a predetermined constant voltage from a regulator circuit mounted on the second circuit board.

In accordance with the tenth aspect, the package of the circuit module does not include electronic parts that are possibly used by a part other than the communication converter such as the regulator circuit. This avoids a complicated design.

In accordance with an eleventh aspect of the present invention, the circuit module according to any one of the first to tenth aspects is configured so that the first circuit board includes a first surface on which the communication converter is mounted and a second surface opposite to the first surface, and the plurality of first terminals is formed on the second surface.

In accordance with the eleventh aspect, the surface on which the electronic part is mounted and the surface on which the connection terminals are formed are separated in the first circuit board. Thus, the electronic part is easily mounted on the first circuit board.

In accordance with a twelfth aspect of the present invention, the circuit module according to any one of the first to eleventh aspects is configured so that the communication converter includes a plurality of second terminals connected to the first circuit board, and a pitch of the plurality of first terminals differs from a pitch of the plurality of second terminals.

In accordance with the twelfth aspect, the pitch of the first terminals and the pitch of the second terminals can be changed. This increases the degree of freedom of the design such as the layout of the electronic part on the first circuit board and the wiring of the first circuit board.

In accordance with a thirteenth aspect of the present invention, the circuit module according to the twelfth aspect is configured so that the pitch of the plurality of first terminals is larger than the pitch of the plurality of second terminals.

In accordance with the thirteenth aspect, the pitch of the first terminals is increased. Thus, the circuit module is easily mounted on the second circuit board.

In accordance with a fourteenth aspect of the present invention, the circuit module according to the twelfth or thirteenth aspect is configured so that the pitch of the plurality of first terminals is greater than or equal to 0.60 mm and less than or equal to 0.70 mm, and the pitch of the plurality of second terminals is greater than or equal to 0.25 mm and less than or equal to 0.35 mm.

In accordance with the fourteenth aspect, the pitch of the first terminals is increased. Thus, the circuit module is easily mounted on the second circuit board.

In accordance with a fifteenth aspect of the present invention, the circuit module according to any one of the first to eleventh aspects is configured so that the communication converter includes a plurality of second terminals connected to the first circuit board, and the first terminals differ in total number from the second terminals.

In accordance with the fifteenth aspect, the number of first terminals and the number of second terminals can be changed. This increases the degree of freedom of the design such as the layout of the electronic part on the first circuit board and the wiring of the first circuit board.

In accordance with a sixteenth aspect of the present invention, the circuit module according to the fifteenth aspect is configured so that the total number of the first terminals is less than the total number of the second terminals.

In accordance with the sixteenth aspect, the number of first terminals is reduced. Thus, the circuit module is easily mounted on the second circuit board.

In accordance with a seventeenth aspect of the present invention, the circuit module according to the fifteenth or sixteenth aspect is configured so that the total number of the first terminals is greater than or equal to forty-five and less than or equal to fifty-four, and the total number of the second terminals is greater than or equal to fifty-five and less than or equal to sixty-four.

In accordance with the seventeenth aspect, a fewer number of first terminals is provided. Thus, the circuit module is easily mounted on the second circuit board.

In accordance with an eighteenth aspect of the present invention, the circuit module according to any one of the first to seventeenth aspects is configured so that the first circuit board is a multilayer board.

In accordance with the eighteenth aspect, the bicycle electric component is easily matched to a communication system that uses power line communication.

In accordance with a nineteenth aspect of the present invention, the circuit module according to any one of the first to eighteenth aspects further includes a resin member that covers the first circuit board.

In accordance with the nineteenth aspect, the resin member protects the electronic part included in the circuit module. This improves the durability of the circuit module and facilitates the handling of the circuit module.

In accordance with a twentieth aspect of the present invention, the circuit module according to any one of the first to nineteenth aspects is configured so that the first circuit board is equiangular quadrilateral, and the first circuit board has an outer shape, one side of which is greater than or equal to 4 mm and less than or equal to 6 mm. The twentieth aspect contributes to reduction in the size of the second circuit board and ultimately the size of the entire bicycle electric component.

In accordance with a twenty-first aspect of the present invention, the circuit module according to any one of the first to twentieth aspects is configured so that the circuit module has a thickness that is less than or equal to 1.3 mm. The twenty-first aspect contributes to reduction in the size of the entire bicycle electric component.

In accordance with a twenty-second aspect of the present invention, the circuit module according to any one of the first to twenty-first aspects is configured so that the communication other than the power line communication is serial communication.

In accordance with the twenty-second aspect, even in a case where a bicycle electric component on which the circuit module is mounted uses serial communication, communication can be established with a bicycle electric component that uses power line communication. This improves the versatility of the bicycle electric component.

A twenty-third aspect of the present invention is a bicycle electric component that includes the circuit module according to any one of the first to twenty-second aspects.

In accordance with the twenty-third aspect, even in a case where a bicycle electric component on which the circuit module is mounted uses communication other than power line communication, communication can be established with a bicycle electric component that uses power line communication. This improves the versatility of the bicycle electric component.

A twenty-fourth aspect of the present invention is a communication system in which power line communication is performed between a plurality of electric components mounted on a bicycle. At least one of the plurality of electric components includes the circuit module according to any one of the first to twenty-second aspects.

In accordance with the twenty-fourth aspect, even in a case where a bicycle electric component on which the circuit module is mounted uses communication other than power line communication, communication can be established with a bicycle electric component that uses power line communication. This improves the versatility of the bicycle electric component.

In accordance with a twenty-fifth aspect of the present invention, the communication system according to the twenty-fourth aspect is configured so that the plurality of electric components includes at least two of a power supply, a drive unit that assists in travel of the bicycle, an electric shifting device, an electric suspension, an electric adjustable seatpost, an electric brake, a light, and a display device.

In accordance with the twenty-fifth aspect, even in a case where a plurality of electric components on which the circuit module is mounted uses communication other than power line communication, communication can be established with a bicycle electric component that uses power line communication. This improves the versatility of the bicycle electric component.

In accordance with a twenty-sixth aspect of the present invention, the communication system according to the twenty-fifth aspect is configured so that the plurality of electric components includes the power supply and the display device, and the power line communication is performed between the power supply and the display device.

In accordance with the twenty-sixth aspect, even in a case where at least one of the power supply and the display device uses communication other than power line communication, power line communication can be performed between the power supply and the display device. This improves the versatility of the power supply and the display device.

A twenty-seventh aspect of the present invention is a communication system in which power line communication is performed between a plurality of electric components configured to be mounted on a mobile body. At least one of the plurality of electric components includes a circuit module and a second circuit board. The circuit module includes a first circuit board, a communication converter configured to convert between information appropriate to the power line communication and information appropriate to communication other than the power line communication and mounted on the first circuit board, and a plurality of first terminals formed on the first circuit board. The plurality of first terminals is connected to the second circuit board. The plurality of electric components includes a power supply and a display device. The power line communication is performed between the power supply and the display device.

In accordance with the twenty-seventh aspect, even in a case where at least one of the power supply and the display device, serving as electric components for a mobile body and including the circuit module, uses communication other than power line communication, power line communication can be performed between the power supply and the display device. This improves the versatility of the power supply and the display device.

The circuit module, the bicycle electric component, and the communication system described above are easily matched to a communication system that uses power line communication.

DETAILED DESCRIPTION OF THE EMBODIMENTS

First Embodiment

Figure 1:
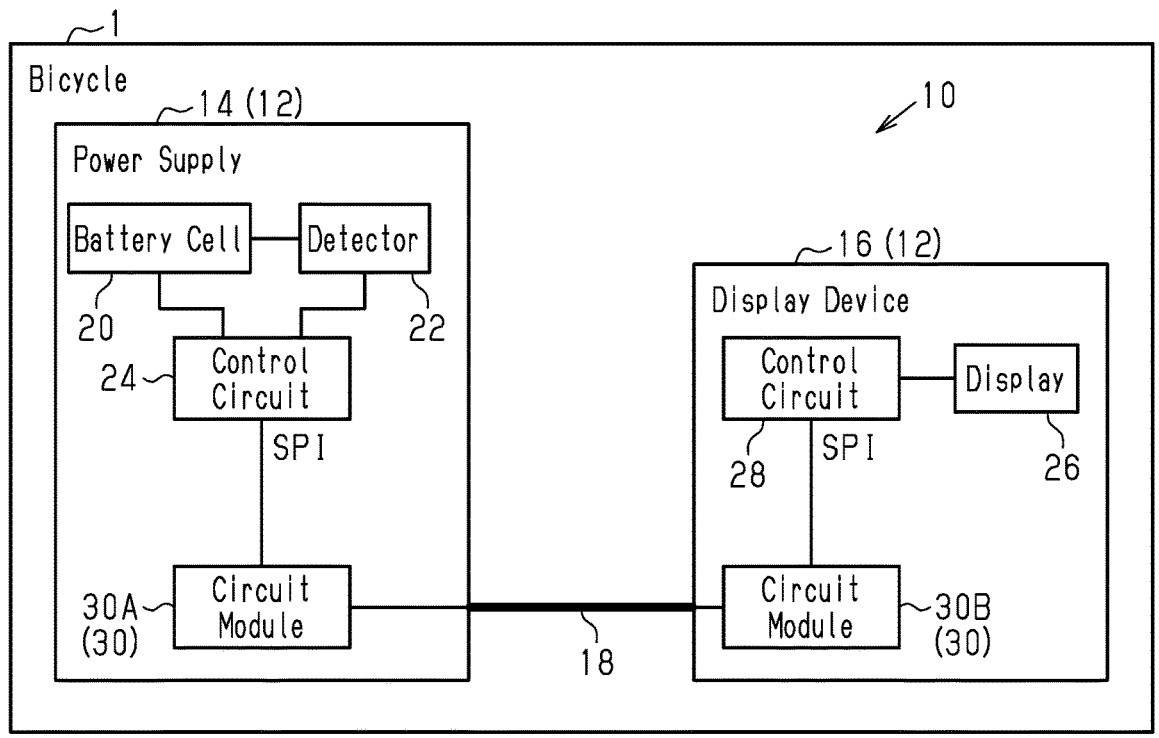
FIG. 1 is a block diagram showing the electrical configuration of a first embodiment of a communication system.

As shown in FIG. 1, a first embodiment of a communication system 10 performs power line communication between a plurality of electric components 12 configured to be mounted on a mobile body 1. Examples of the mobile body 1 include a self-propelled vehicle and a human-powered vehicle. The self-propelled vehicle includes a two-wheeled motor vehicle and a four-wheeled motor vehicle. The human-powered vehicle includes a bicycle, a toy kick scooter, a wheelchair, a pushing cart, a stroller, and a pulling cart. FIG. 1 shows a bicycle as an example of the mobile body 1. The bicycle includes, for example, a mountain bike, a road bike, and a city bike.

Each of the plurality of electric components 12 is a bicycle electric component 12. The plurality of electric components 12 includes a power supply 14 and a display device 16. The power supply 14 and the display device 16 are connected to each other by a power line 18. The power line 18 is a wire that supplies electric power from the power supply 14 to the display device 16. In the present embodiment, power line communication is performed between the power supply 14 and the display device 16 through the power line 18. Power line communication superimposes a digital signal on direct current power flowing through the power line 18 so that, for example, to power and the signal are provided from the power supply 14 to the display device 16. It will be appreciated that information appropriate to power line communication as described herein indicates information that is communicated via a power line communications path using a power line communications protocol.

The bicycle electric components 12 include a circuit module 30. More specifically, the power supply 14 includes a battery cell 20, a voltage detector 22, a control circuit 24, and a circuit module 30A. The battery cell 20, the voltage detector 22, and the circuit module 30A are electrically connected to the control circuit 24. The voltage detector 22 detects voltage of the battery cell 20. The voltage detector 22 sends a signal corresponding to the voltage of the battery cell 20 to the control circuit 24. One example of the voltage detector 22 is a voltage sensor. The control circuit 24 calculates the charge level of the battery cell 20 based on the signal from the voltage detector 22. The control circuit 24 sends information related to the power supply 14 to the circuit module 30A. One example of the information related to the power supply 14 is the charge level of the battery cell 20. Communication other than power line communication is performed between the control circuit 24 and the circuit module 30A. It will be appreciated that information appropriate to communication other than power line communication as described herein indicates information that is not communicated via a power line communications path using a power line communications protocol. One example of the communication other than power line communication is serial communication. Examples of communication protocols of serial communication include a serial peripheral interface (SPI) and an inter-integrated circuit (I2C). In FIG. 1, the communication protocol of serial communication is an SPI. The communication other than power line communication can differ from serial communication and can be, for example, parallel communication.

The display device 16 includes a display 26, a control circuit 28, and a circuit module 30B. The display 26 and the circuit module 30B are electrically connected to the control circuit 28. The display 26 shows information related to the mobile body 1. The information related to the mobile body 1 includes, for example, a travel speed and a shifting stage of the bicycle. The control circuit 28 controls a display mode of the display 26. Communication other than power line communication is performed between the control circuit 28 and the circuit module 30B. One example of the communication other than power line communication is serial communication. In FIG. 1, the communication protocol of serial communication is an SPI. The communication other than power line communication can differ from serial communication and can be, for example, parallel communication.

The circuit module 30A of the power supply 14 and the circuit module 30B of the display device 16 are connected by the power line 18 so as to communicate with each other. The circuit module 30A and the circuit module 30B have the same configuration. The circuit module 30A and the circuit module 30B convert between information appropriate to power line communication and information appropriate to communication other than power line communication with each other. The circuit module 30A converts the information related to the power supply 14, which is received through serial communication as information appropriate to communication other than power line communication, into information appropriate to power line communication and sends the information to the circuit module 30B. The circuit module 30B converts the information related to the power supply 14 and appropriate to power line communication into information configured to be sent through serial communication and appropriate to communication other than power line communication. The circuit module 30B sends the information related to the power supply 14 and configured to be sent through serial communication to the control circuit 28. Additionally, the circuit module 30B can convert information shown in the display 26, which is information configured to be sent through serial communication as information appropriate to communication other than power line communication, into information appropriate to power line communication and send the information to the circuit module 30A. The circuit module 30A can convert information shown in the display 26, which is information appropriate to power line communication, into information configured to be sent through serial communication as information appropriate to communication other than power line communication and send the information to the control circuit 24.

Figure 2:
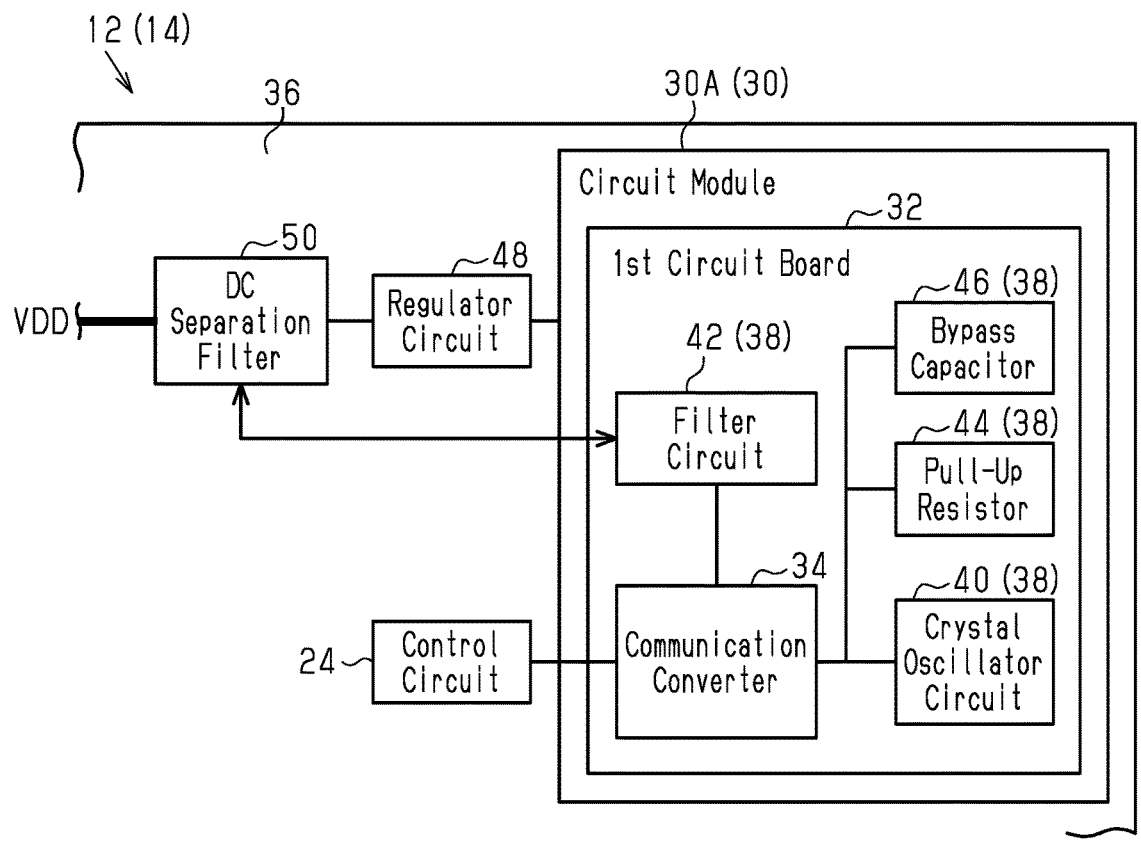
FIG. 2 is a block diagram showing the electrical configuration of a circuit module and its peripheral circuits.

The configuration of the circuit module 30 that can be mounted on the bicycle electric components 12 and its peripheral circuits will now be described. FIG. 2 shows the configuration of the circuit module 30A and its peripheral circuits in a case where the power supply 14 is used as an example of the bicycle electric components 12. The configuration of the circuit module 30B and its peripheral circuits in a case where the display device 16 is used as an example of the bicycle electric components 12 is the same as that shown in FIG. 2.

The circuit module 30A includes a first circuit board 32 and a communication converter 34. The circuit module 30A is connected to a second circuit board 36 included in the electric component 12 (power supply 14). More specifically, the first circuit board 32 is electrically connected to the second circuit board 36.

The communication converter 34 is configured to convert between information appropriate to power line communication and information appropriate to communication other than power line communication and is mounted on the first circuit board 32. The communication other than power line communication is serial communication. The communication converter 34 includes a processing portion that performs a baseband process on power line communication; various interfaces for communication with various sensors (e.g., voltage detector 22) of the electric component 12 (power supply 14), peripheral devices such as an LED driver, and the control circuit 24; and an arithmetic processing unit that controls the interfaces. The interfaces include, for example, an SPI and a universal asynchronous receiver/transmitter (UART) used as data interfaces with the control circuit 24, an I2C used as a data interface with peripheral devices, pulse width modulation (PWM), and general purpose input/output (GPIO). The arithmetic processing unit includes, for example, a central processing unit (CPU) or a micro processing unit (MPU). The arithmetic processing unit can be configured to execute a TCP/IP protocol process.

The circuit module 30A further includes an electronic part 38 that is mounted on the first circuit board 32 and different from the communication converter 34. The electronic part 38 different from the communication converter 34 includes a crystal oscillator circuit 40. The electronic part 38 different from the communication converter 34 includes a filter circuit 42. The electronic part 38 different from the communication converter 34 includes a pull-up resistor 44. The electronic part 38 different from the communication converter 34 includes a bypass capacitor 46. Further, the electronic part 38 different from the communication converter 34 can include at least two or more electronic parts of the crystal oscillator circuit 40, the filter circuit 42, the pull-up resistor 44, and the bypass capacitor 46. In the present embodiment, the electronic part 38 different from the communication converter 34 includes the crystal oscillator circuit 40, the filter circuit 42, the pull-up resistor 44, and the bypass capacitor 46. The crystal oscillator circuit 40, the filter circuit 42, the pull-up resistor 44, and the bypass capacitor 46 are connected to the communication converter 34. The crystal oscillator circuit 40, the filter circuit 42, the pull-up resistor 44, and the bypass capacitor 46 are mounted on the first circuit board 32.

The crystal oscillator circuit 40 drives the communication converter 34. The crystal oscillator circuit 40 includes a crystal oscillator that vibrates at a predetermined frequency. The crystal oscillator circuit 40 is used in a reference clock that drives the communication converter 34.

The filter circuit 42 removes noise from a signal that is input to the circuit module 30A and sends the noise-removed signal to the communication converter 34. A known configuration can be used as the configuration of the filter circuit 42. One example of the filter circuit 42 includes a capacitor and a resistor. The filter circuit 42 can further include an operational amplifier.

The pull-up resistor 44 is provided to ensure the transmission of a HI signal or a LOW signal to the input of the communication converter 34. The pull-up resistor 44 is arranged between the communication converter 34 and the line of a power supply voltage (VDD) that is input to the circuit module 30A. In a case where no signal is input to the communication converter 34, the pull-up resistor 44 applies a voltage to the communication converter 34 so that the logic level of the communication converter 34 is high.

The bypass capacitor 46 has a first terminal connected between the communication converter 34 and the line of power supply voltage (VDD) input to the circuit module 30A. The bypass capacitor 46 also has a second terminal connected to a ground (VSS) line. The bypass capacitor 46 removes noise superimposed on the power supply voltage.

As shown in FIG. 2, the electric component 12 further includes a regulator circuit 48 and a DC separation filter 50. The regulator circuit 48 and the DC separation filter 50 are mounted on the second circuit board 36. More specifically, the regulator circuit 48 and the DC separation filter 50 are mounted in a region of the second circuit board 36 other than the region where the circuit module 30A is mounted.

The regulator circuit 48 is connected to the power supply voltage (VDD) line. The regulator circuit 48 generates a predetermined constant voltage and sends the voltage to the communication converter 34 of the circuit module 30A. The communication converter 34 is operated based on the voltage sent from the regulator circuit 48. In other words, the communication converter 34 is operated by the supply of the predetermined constant voltage from the regulator circuit 48 mounted on the second circuit board 36.

The DC separation filter 50 is electrically connected to the regulator circuit 48. The DC separation filter 50 includes an inductor and a capacitor. The DC separation filter 50 separates a direct current power that is supplied to the power supply voltage (VDD) line and a signal sent through power line communication. The direct current power is supplied to the regulator circuit 48, and the separated signal is input to the filter circuit 42.

Figure 3:
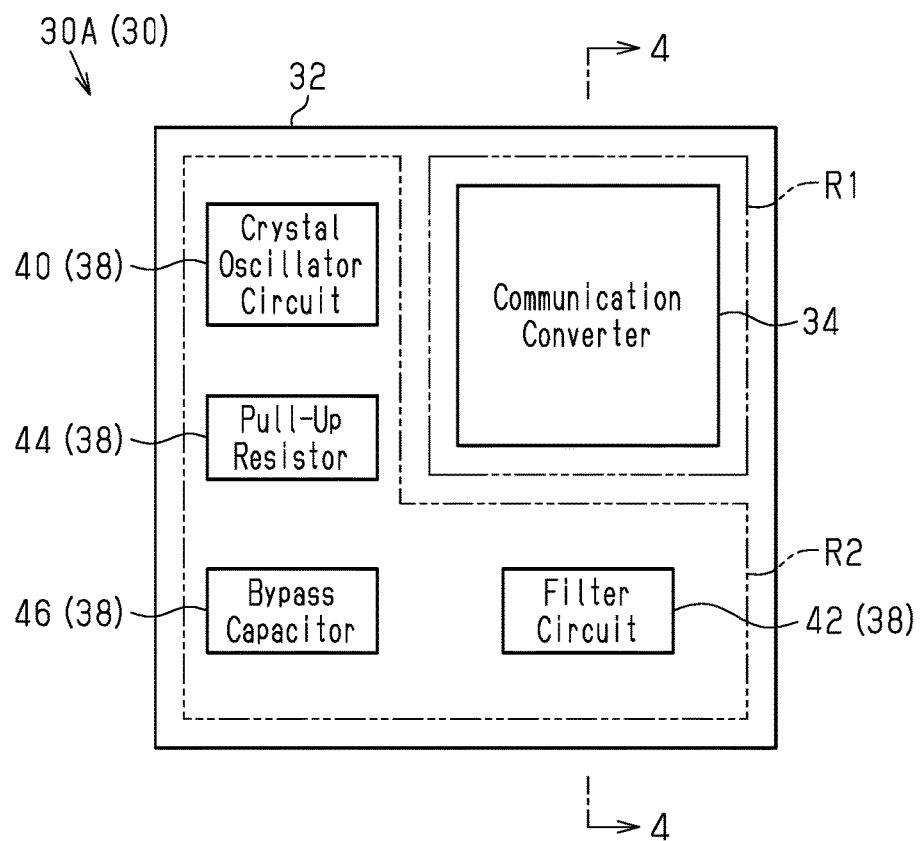
FIG. 3 is a plan view of a circuit module schematically showing the layout of the circuit module.

FIG. 3 schematically shows the layout of the communication converter 34 and the electronic part 38 different from the communication converter 34, including the crystal oscillator circuit 40, the filter circuit 42, the pull-up resistor 44, and the bypass capacitor 46, in the first circuit board 32 of the circuit module 30A.

As shown in FIG. 3, the first circuit board 32 includes a first region R1 where the communication converter 34 is mounted and a second region R2 where the electronic part 38 different from the communication converter 34 is mounted. The second region R2 is greater in area than the first region R1. The relationship between the area of the first region R1 and the area of the second region R2 can be changed, for example, in accordance with the number of electronic parts 38 different from the communication converter 34. In one example, the area of the second region R2 is two times or more larger than the area of the first region R1.

The first circuit board 32 is equiangular quadrilateral. In FIG. 3, the first circuit board 32 is square in a plan view. One side of the outer shape of the first circuit board 32 is greater than or equal to 4 mm and less than or equal to 6 mm. In the present embodiment, one side of the outer shape of the first circuit board 32 is 5.1 mm. The first circuit board 32 can be changed to any shape in a plan view. For example, the first circuit board 32 can be rectangular in a plan view.

Figure 4:
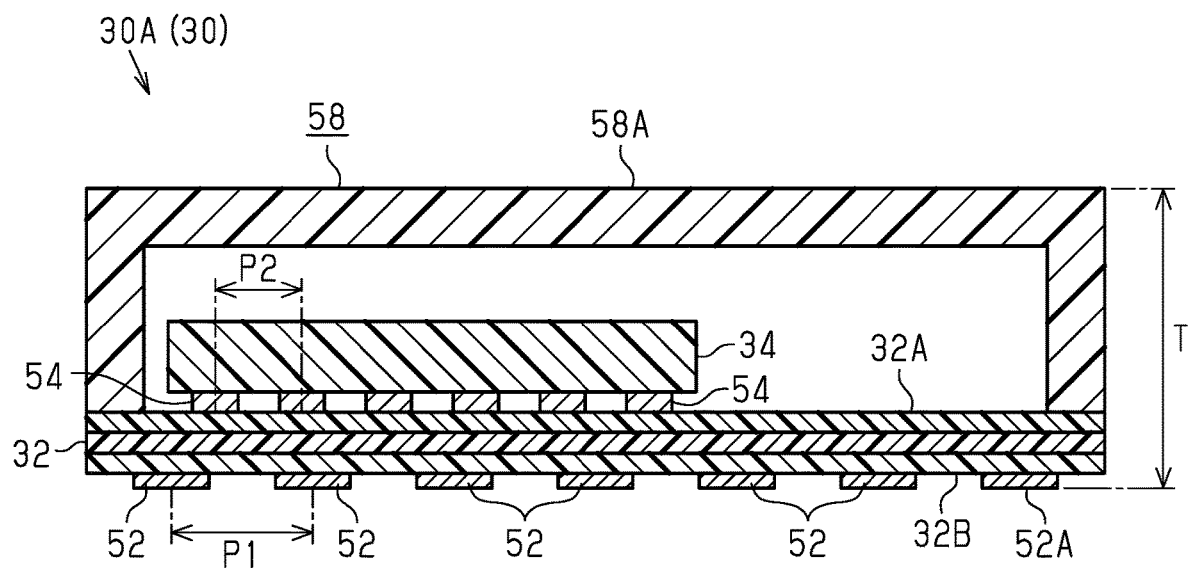
FIG. 4 is a cross-sectional view taken along line 4-4 in FIG. 3.

As shown in FIG. 4, the first circuit board 32 is a multilayer board. The first circuit board 32 includes a first surface 32A on which the communication converter 34 is mounted and a second surface 32B opposite to the first surface 32A. The circuit module 30A includes a plurality of first terminals 52 formed on the first circuit board 32 and connected to the second circuit board 36 (refer to FIG. 2) included in the electric component 12. The plurality of first terminals 52 is formed on the second surface 32B.

The communication converter 34 includes a plurality of second terminals 54 connected to the first circuit board 32. Any relationship can be set between a pitch P1 of the plurality of first terminals 52 and a pitch P2 of the plurality of second terminals 54. In the present embodiment, as shown in FIG. 4, the pitch P1 of the plurality of first terminals 52 differs from the pitch P2 of the plurality of second terminals 54. The pitch P1 of the plurality of first terminals 52 is larger than the pitch P2 of the plurality of second terminals 54. The pitch P1 of the plurality of first terminals 52 can be equal to the pitch P2 of the plurality of second terminals 54. The pitch P1 of the plurality of first terminals 52 can be smaller than the pitch P2 of the plurality of second terminals 54.

The total number of first terminals 52 is greater than or equal to forty-five and less than or equal to fifty-four. The total number of second terminals 54 is greater than or equal to fifty-five and less than or equal to sixty-four. It is preferred that the total number of first terminals 52 differ from the total number of second terminals 54. More specifically, it is preferred that the total number of first terminals 52 be less than the total number of second terminals 54. The total number of first terminals 52 can be equal to the total number of second terminals 54. The total number of first terminals 52 can be greater than the total number of second terminals 54.

A plurality of third terminals (not shown) is formed on the first surface 32A of the first circuit board 32 at locations where the communication converter 34 is mounted. The plurality of third terminals is electrically connected to the plurality of second terminals 54. The total number of third terminals is equal to the total number of second terminals 54. The pitch of the plurality of third terminals is equal to the pitch P2 of the plurality of second terminals 54.

As shown in FIG. 4, the circuit module 30A further includes a resin member 58 covering the first circuit board 32. The resin member 58 covers the communication converter 34 and the electronic part 38 different from the communication converter 34. The resin member 58 of the present embodiment covers the communication converter 34, the crystal oscillator circuit 40, the filter circuit 42, the pull-up resistor 44, and the bypass capacitor 46. One example of a material of the resin member 58 is an epoxy resin. The circuit module 30A has a thickness T that is less than or equal to 1.3 mm. In the present embodiment, the thickness T of the circuit module 30A is 1.15 mm. The thickness T of the circuit module 30A is the distance between an upper surface 58A of the resin member 58 and a surface 52A of each first terminal 52 on which the second circuit board 36 (refer to FIG. 2) is mounted.

Second Embodiment

Figure 5:
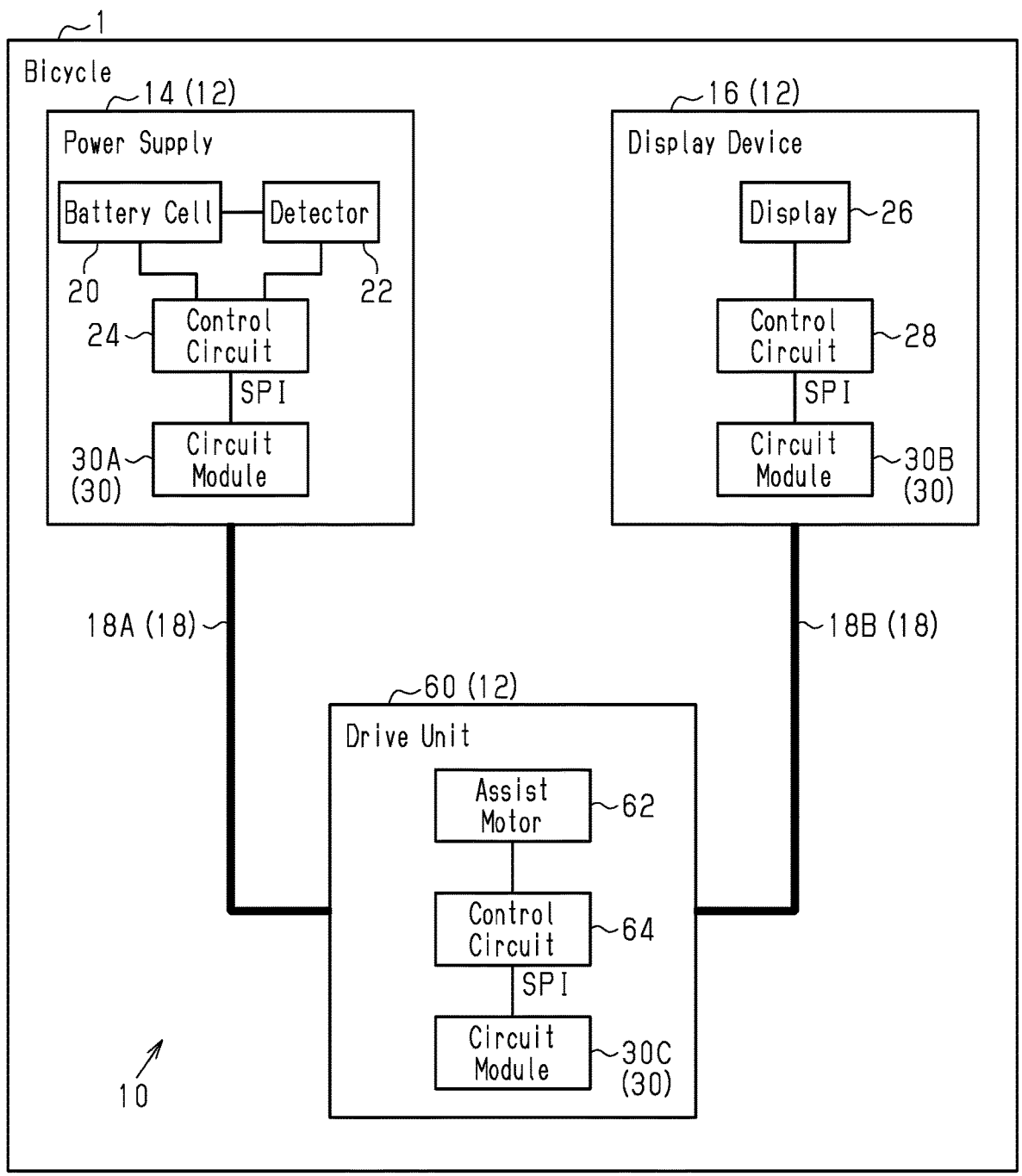
FIG. 5 is a block diagram showing the electrical configuration of a second embodiment of a communication system.

A second embodiment of the communication system 10 will now be described with reference to FIG. 5. The communication system 10 of the second embodiment differs from the communication system 10 of the first embodiment in the number of bicycle electric components 12 and the connection mode of the electric components 12 with the power line 18. In the description hereafter, the same reference characters are given to those elements that are the same as the corresponding elements of the first embodiment. Such elements may not be described in detail.

The communication system 10 includes the power supply 14, the display device 16, and a drive unit 60 as the bicycle electric components 12. The power supply 14 and the drive unit 60 are connected by a first power line 18A. The drive unit 60 and the display device 16 are connected by a second power line 18B.

The drive unit 60 assists in travel of a bicycle. The drive unit 60 includes an assist motor 62, a control circuit 64, and a circuit module 30C. The assist motor 62 applies torque assisting in propulsion of the bicycle to a drivetrain of the bicycle in accordance with human driving force. The control circuit 64 controls driving of the assist motor 62. The circuit module 30C converts between information appropriate to power line communication and information appropriate to communication other than power line communication. The communication other than power line communication is serial communication. The configuration of the circuit module 30C is the same as the configuration of the circuit module 30A. The communication other than power line communication can differ from serial communication and can be, for example, parallel communication.

For example, in a case of sending information related to the power supply 14 to the display device 16, the communication system 10 sends the information as follows. The control circuit 24 sends information related to the power supply 14 to the circuit module 30A through serial communication. The circuit module 30A converts the information that is related to the power supply 14 and sent through serial communication into information appropriate to power line communication. The circuit module 30A sends the information related to the power supply 14 via the first power line 18A to the drive unit 60 through power line communication. The circuit module 30C of the drive unit 60 receives the information related to the power supply 14 and appropriate to power line communication. The circuit module 30C sends the information related to the power supply 14 via the second power line 18B to the display device 16 through power line communication. The circuit module 30B of the display device 16 receives the information related to the power supply 14 and appropriate to power line communication. The circuit module 30B converts the information related to the power supply 14 into information appropriate to serial communication, which is the communication other than power line communication, and sends the information to the control circuit 28. The control circuit 28 shows the information related to the power supply 14 in the display 26 based on the information related to the power supply 14 and sent through serial communication.

In addition to the information related to the power supply 14, the communication system 10 can send information related to the drive unit 60 to the display device 16. One example of the information related to the drive unit 60 is an assist ratio. Another example of the information related to the drive unit 60 is an assist mode.

The control circuit 64 of the drive unit 60 sends the information related to the drive unit 60 to the circuit module 30C through serial communication. The circuit module 30C converts the received information related to the drive unit 60 into information appropriate to power line communication. The circuit module 30C sends the information related to the drive unit 60 via the second power line 18B to the display device 16 through power line communication. The circuit module 30B of the display device 16 receives the information related to the drive unit 60, which is information appropriate to power line communication. The circuit module 30B converts the information related to the drive unit 60 into information appropriate to serial communication, which is the communication other than power line communication, and sends the information to the control circuit 28. The control circuit 28 shows the information related to the drive unit 60 in the display 26 based on the information related to the drive unit 60 and sent through serial communication.

The communication system 10 can send information shown in the display device 16 to the drive unit 60. One example of the information shown in the display device 16 is a travel speed and a shifting stage of the bicycle.

The control circuit 28 of the display device 16 sends the information shown in the display device 16 to the circuit module 30B through serial communication. The circuit module 30B converts the information shown in the display device 16 and sent through serial communication into information appropriate to power line communication. The circuit module 30B sends the information shown in the display device 16 via the second power line 18B to the drive unit 60 through power line communication. The circuit module 30C of the drive unit 60 receives the information shown in the display device 16, which is information appropriate to power line communication. The circuit module 30C converts the information shown in the display device 16 into information appropriate to serial communication, which is the communication other than power line communication, and sends the information to the control circuit 64. The control circuit 64 controls the assist motor 62, for example, based on the information shown in the display device 16.

Modified Examples of Embodiments

The description related to the above embodiments exemplifies, without any intention to limit, applicable forms of a circuit module, a bicycle electric component, and a communication system according to the present invention. The circuit module, the bicycle electric component, and the communication system according to the present invention are applicable to, for example, modified examples of the above embodiments that are described below and combinations of at least two of the modified examples that do not contradict each other.

Figure 6:
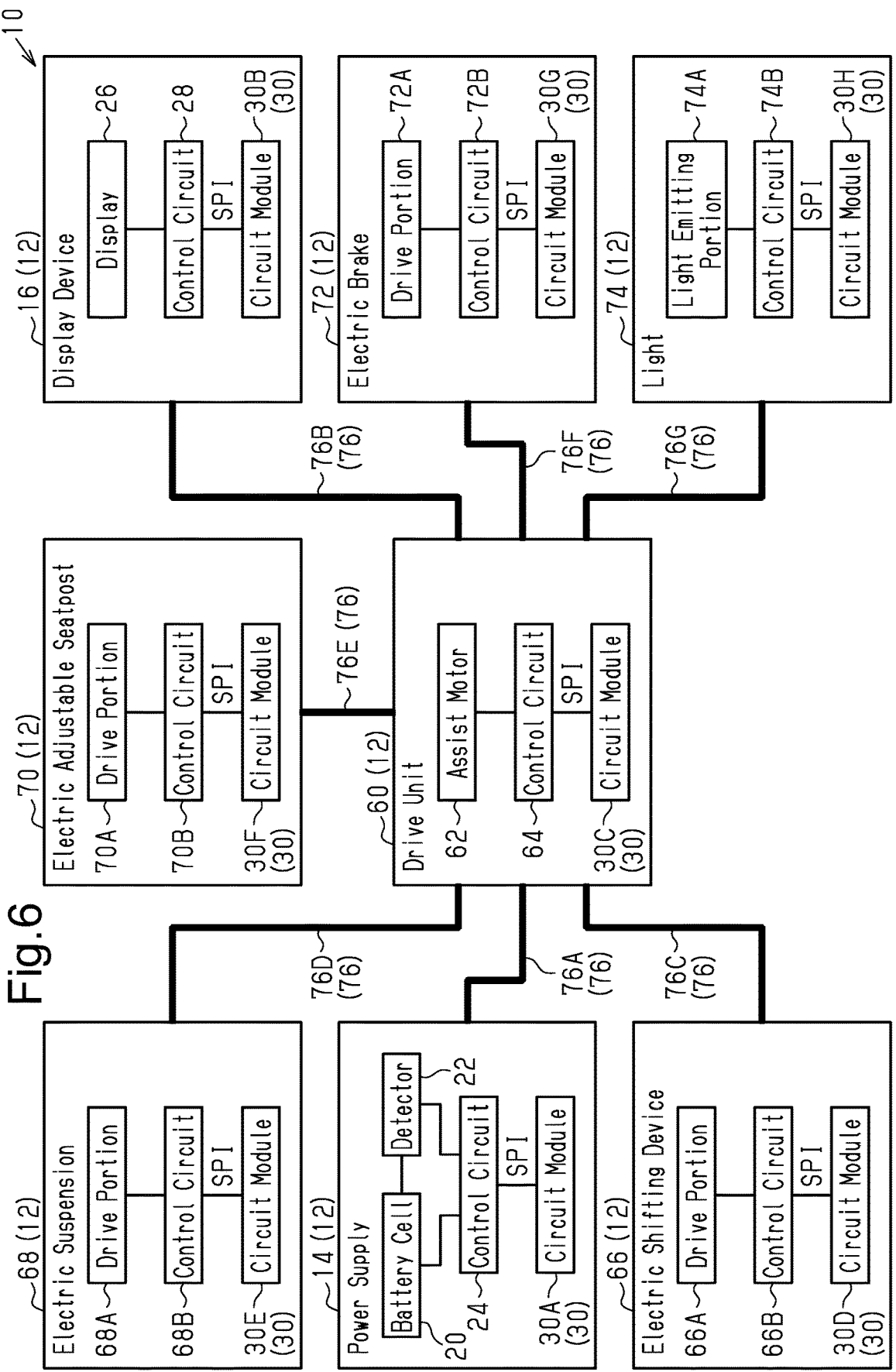
FIG. 6 is a block diagram showing the electrical configuration of a modified example of a communication system.

In the communication system 10, the plurality of electric components 12 can be changed to any configuration. For example, the plurality of electric components 12 includes at least two of the power supply 14, the drive unit 60 assisting in travel of the bicycle, an electric shifting device 66, an electric suspension 68, an electric adjustable seatpost 70, an electric brake 72, a light 74, and the display device 16. FIG. 6 shows the communication system 10 in which all of the power supply 14, the electric shifting device 66, the electric suspension 68, the electric adjustable seatpost 70, the electric brake 72, the light 74, and the display device 16 are connected to the drive unit 60 by power lines 76. More specifically, the power supply 14 and the drive unit 60 are connected by a power line 76A, the display device 16 and the drive unit 60 are connected by a power line 76B, and the electric shifting device 66 and the drive unit 60 are connected by a power line 76C. The electric suspension 68 and the drive unit 60 are connected by a power line 76D, the electric adjustable seatpost 70 and the drive unit 60 are connected by a power line 76E, the electric brake 72 and the drive unit 60 are connected by a power line 76F, and the light 74 and the drive unit 60 are connected by a power line 76G.

One example of the electric shifting device 66 is an electric rear derailleur. The electric shifting device 66 includes a drive portion 66A, a control circuit 66B, and a circuit module 30D. The electric shifting device 66 drives the drive portion 66A to move the chain between rear sprockets and change the transmission ratio of the bicycle. The electric shifting device 66 can be an electric front derailleur. The control circuit 66B is electrically connected to the drive portion 66A and the circuit module 30D. The control circuit 66B controls driving of the drive portion 66A. The circuit module 30D and the circuit module 30A have the same configuration. Communication other than power line communication is performed between the control circuit 66B and the circuit module 30D. The communication other than power line communication is serial communication. The circuit module 30D performs power line communication with the circuit module 30C of the drive unit 60.

One example of the electric suspension 68 is an electric front suspension arranged on a front fork to dampen an impact applied to a front wheel assembly. The electric suspension 68 includes a drive portion 68A, a control circuit 68B, and a circuit module 30E. The electric suspension 68 is configured so that a damping ratio, a stroke amount, and a lockout state are settable as operation parameters. The electric suspension 68 is configured to change the operation parameters by driving the drive portion 68A. The electric suspension 68 can be a rear suspension that dampens an impact applied to a rear wheel assembly. The control circuit 68B controls driving of the drive portion 68A. The circuit module 30E and the circuit module 30A have the same configuration. Communication other than power line communication is performed between the control circuit 68B and the circuit module 30E. The communication other than power line communication is serial communication. The circuit module 30E performs power line communication with the circuit module 30C of the drive unit 60.

The electric adjustable seatpost 70 changes the height of a saddle by changing the position of a seatpost movably attached to a frame of the bicycle with respect to the frame. The electric adjustable seatpost 70 includes a drive portion 70A, a control circuit 70B, and a circuit module 30F. The drive portion 70A changes the position of a seat with respect to the frame. The control circuit 70B controls driving of the drive portion 70A. The circuit module 30F and the circuit module 30A have the same configuration. Communication other than power line communication is performed between the control circuit 70B and the circuit module 30F. The communication other than power line communication is serial communication. The circuit module 30F performs power line communication with the circuit module 30C of the drive unit 60.

The electric brake 72 controls a rotary body (not shown) arranged on the front wheel assembly or rear wheel assembly of the bicycle. The electric brake 72 is an electric disc brake device in which the rotary body is a rotor provided on a wheel of the bicycle or an electric rim brake in which the rotary body is a rim of a wheel. The electric brake 72 includes a drive portion 72A, a control circuit 72B, and a circuit module 30G. The drive portion 72A moves a braking portion (not shown) so that the braking portion is shifted between a braking position where the braking portion is pushed against the rotary body and a release position where the braking portion is separate from the rotary body. The control circuit 72B controls driving of the drive portion 72A. The circuit module 30G and the circuit module 30A have the same configuration. Communication other than power line communication is performed between the control circuit 72B and the circuit module 30G. The communication other than power line communication is serial communication. The circuit module 30G performs power line communication with the circuit module 30C of the drive unit 60.

The light 74 includes a light emitting portion 74A, a control circuit 74B, and a circuit module 30H. One example of the light emitting portion 74A is an LED. The control circuit 74B controls a luminous state of the light emitting portion 74A. The luminous state includes an illuminated state, an unilluminated state, and a brightness adjustment in the illuminated state. The circuit module 30H and the circuit module 30A have the same configuration. Communication other than power line communication is performed between the control circuit 74B and the circuit module 30H. The communication other than power line communication is serial communication. The circuit module 30H performs power line communication with the circuit module 30C of the drive unit 60.

One example of a communication mode of the communication system 10 will now be described. The control circuit 66B of the electric shifting device 66 sends information related to the electric shifting device 66 to the circuit module 30D through serial communication. One example of the information related to the electric shifting device 66 is the shifting stage. The circuit module 30D converts the information related to the electric shifting device 66 and sent through serial communication into information appropriate to power line communication and sends the information to the circuit module 30C of the drive unit 60. The control circuit 68B of the electric suspension 68 sends information related to the electric suspension 68 to the circuit module 30E through serial communication. One example of the information related to the electric suspension 68 is the damping ratio, the stroke amount, and the lockout state. The circuit module 30E converts the information related to the electric suspension 68 and sent through serial communication into information appropriate to power line communication and sends the information to the circuit module 30C of the drive unit 60. The control circuit 70B of the electric adjustable seatpost 70 sends information related to the electric adjustable seatpost 70 to the circuit module 30F through serial communication. One example of the information related to the electric adjustable seatpost 70 is the position of the seatpost with respect to the frame of the bicycle. The circuit module 30F converts the information related to the electric adjustable seatpost 70 and sent through serial communication into information appropriate to power line communication and sends the information to the circuit module 30C of the drive unit 60. The control circuit 74B of the light 74 sends information related to the light 74 to the circuit module 30H through serial communication. The information related to the light 74 is the luminous state of the light 74. The circuit module 30H converts the information related to the light 74 and sent through serial communication into information appropriate to power line communication and sends the information to the circuit module 30C of the drive unit 60.

In a case where the circuit module 30C receives at least one piece of the information described above, the circuit module 30C performs power line communication with the circuit module 30B of the display device 16. The circuit module 30B converts the received information into information appropriate to serial communication, which is the communication other than power line communication, and sends the information to the control circuit 28. The control circuit 28 shows the information received by the circuit module 30B in the display 26.

In the communication system 10 shown in FIG. 6, two to seven of the power supply 14, the electric shifting device 66, the electric suspension 68, the electric adjustable seatpost 70, the electric brake 72, the light 74, and the display device 16 can be connected by the power lines 76 without being connected via the drive unit 60.

In the communication system 10 shown in FIG. 6, two to seven of the drive unit 60, the electric shifting device 66, the electric suspension 68, the electric adjustable seatpost 70, the electric brake 72, the light 74, and the display device 16 can be connected by communication lines through which signals are exchanged. Power line communication can be performed via the communication lines. More specifically, power and a signal are superimposed on the communication lines and sent between the plurality of electric components 12. Thus, power line communication includes a form in which power and signals are superimposed on a power line and a form in which power and signals are superimposed on a signal line.

In the communication system 10 shown in FIG. 6, two to eight of the power supply 14, the drive unit 60, the electric shifting device 66, the electric suspension 68, the electric adjustable seatpost 70, the electric brake 72, the light 74, and the display device 16 can be connected by the power lines 76. In other words, in the power supply 14, the drive unit 60, the electric shifting device 66, the electric suspension 68, the electric adjustable seatpost 70, the electric brake 72, the light 74, and the display device 16, there can be an electric component 12 that is not connected by the power lines 76. Thus, only at least two electric components 12 in the power supply 14, the drive unit 60, the electric shifting device 66, the electric suspension 68, the electric adjustable seatpost 70, the electric brake 72, the light 74, and the display device 16 need to be connected by the power lines 76.

The electronic parts of the circuit modules 30A to 30H can be changed to any configuration. In one example, at least one of the circuit modules 30A to 30H does not include the electronic part 38 different from the communication converter 34. In a second example, at least one of the circuit modules 30A to 30H does not include any one to three of the crystal oscillator circuit 40, the filter circuit 42, the pull-up resistor 44, and the bypass capacitor 46, which are electronic parts different from the communication converter 34. In a third example, at least one of the circuit modules 30A to 30H includes at least one of the regulator circuit 48 and the DC separation filter 50, which are electronic parts different from the communication converter 34. In a fourth example, at least one of the circuit modules 30A to 30H has a configuration combining the configuration of the second example and the configuration of the third example.

The resin member 58 can be omitted from at least one of the circuit modules 30A to 30H. In the circuit modules 30A to 30H, the first circuit board 32 can be a single layer board.

The plurality of first terminals 52 of the circuit modules 30A to 30H can be changed to any configuration. In one example, the plurality of first terminals 52 includes lead frames. The lead frame has a first end, for example, connected to an outer portion of the first circuit board 32 and a second end projecting from the outer portion of the first circuit board 32 and connected to the second circuit board 36.

Figure 7:
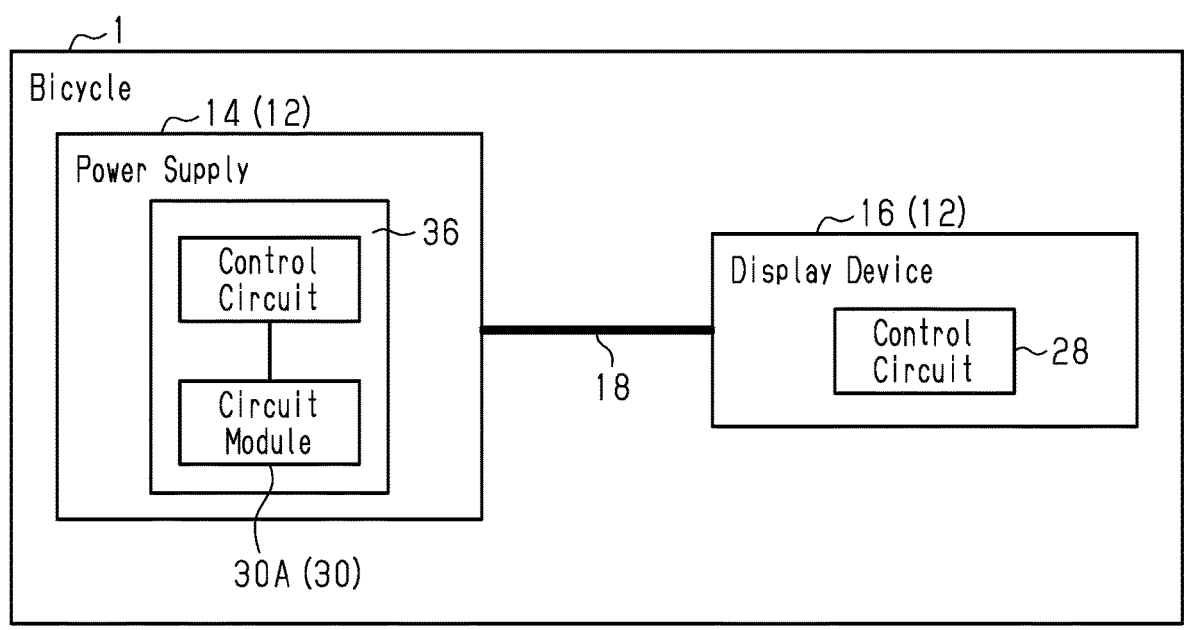
FIG. 7 is a block diagram showing the electrical configuration of another modified example of a communication system.

In the communication system 10, at least one of the plurality of electric components 12 includes the circuit module 30 and the second circuit board 36. More specifically, the circuit module 30 can be omitted from an electric component 12 that communicates with another one of the plurality of electric components 12. As shown in FIGS. 2 to 4, the circuit module 30 is configured to convert between information appropriate to power line communication and information appropriate to communication other than power line communication and includes the communication converter 34 mounted on the first circuit board 32 and the plurality of first terminals 52 formed on the first circuit board 32. In one example, as shown in FIG. 7, the plurality of electric components 12 includes the power supply 14 and the display device 16. Power line communication is performed between the power supply 14 and the display device 16. In FIG. 7, the power supply 14 includes the circuit module 30 (circuit module 30A), and the display device 16 does not include the circuit module 30 (circuit module 30B). The power supply 14 and the display device 16 are connected by the power line 18. The control circuit 28 of the display device 16 performs power line communication with the circuit module 30A of the power supply 14 via the power line 18.

LIST OF REFERENCE CHARACTERS 1) mobile body (bicycle); 10) communication system; 12) electric component; 14) power supply; 16) display device; 18, 18A, 18B) power line; 30, 30A, 30B, 30C, 30D, 30E, 30F, 30G, 30H) circuit module; 32) first circuit board; 32A) first surface; 32B) second surface; 34) communication converter; 36) second circuit board; 38) electronic part different from communication converter; 40) crystal oscillator circuit; 42) filter circuit; 44) pull-up resistor; 46) bypass capacitor; 48) regulator circuit; 52) first terminal; 54) second terminal; 58) resin member; 60) drive unit; 66) electric shifting device; 68) electric suspension; 70) electric adjustable seatpost; 72) electric brake; 74) light; 76A to 76G) power line; R1) first region; R2) second region; P1) first terminal pitch; P2) second terminal pitch; T) circuit module thickness

The invention claimed is:

1. A communication system in which power line communication is performed between a plurality of electric components mounted on a bicycle, wherein at least one of the plurality of electric components includes a circuit module configured to be mounted on a bicycle electric component, the circuit module comprising:
   a first circuit board;
   a communication converter mounted on the first circuit board, the communication converter being configured to convert information communicated via one of power line communication and serial communication to information to be communicated via the other of power line communication and serial communication; and
   a plurality of first terminals formed on the first circuit board, the plurality of first terminals being connected to a second circuit board included in the bicycle electric component, wherein
   the plurality of electric components includes at least two of a power supply, a drive unit that assists in travel of the bicycle, an electric shifting device, an electric suspension, an electric adjustable seatpost, an electric brake, a light, and a display device.

2. The communication system according to claim 1, wherein the circuit module further comprises an electronic part mounted on the first circuit board and different from the communication converter.

3. The communication system according to claim 2, wherein the electronic part different from the communication converter includes a crystal oscillator circuit that drives the communication converter.

4. The communication system according to claim 2, wherein the electronic part different from the communication converter includes a pull-up resistor connected to the communication converter, the pull-up resistor being configured to transmit a HI signal or a LOW signal to an input of the communication converter.

5. The communication system according to claim 2, wherein the electronic part different from the communication converter includes a bypass capacitor connected to the communication converter, the bypass capacitor being configured to remove a noise superimposed on a power supply voltage.

6. The communication system according to claim 2, wherein the first circuit board includes a first region where the communication converter is mounted and a second region where the electronic part different from the communication converter is mounted.

7. The communication system according to claim 6, wherein the second region is greater in area than the first region.

8. The communication system according to claim 1, wherein the first circuit board is connected to the second circuit board by the plurality of first terminals.

9. The communication system according to claim 1, wherein the communication converter is operated by a supply of a predetermined constant voltage from a regulator circuit mounted on the second circuit board.

10. The communication system according to claim 1, wherein
the first circuit board includes a first surface on which the communication converter is mounted and a second surface opposite to the first surface, and
the plurality of first terminals is formed on the second surface.

11. The communication system according to claim 1, wherein
the communication converter includes a plurality of second terminals connected to the first circuit board, and
a pitch of the plurality of first terminals differs from a pitch of the plurality of second terminals.

12. The communication system according to claim 11, wherein the pitch of the plurality of first terminals is larger than the pitch of the plurality of second terminals.

13. The communication system according to claim 11, wherein
the pitch of the plurality of first terminals is greater than or equal to 0.60 mm and less than or equal to 0.70 mm, and
the pitch of the plurality of second terminals is greater than or equal to 0.25 mm and less than or equal to 0.35 mm.

14. The communication system according to claim 1, wherein
the communication converter includes a plurality of second terminals connected to the first circuit board, and
the first terminals differ in total number from the second terminals.

15. The communication system according to claim 14, wherein the total number of the first terminals is less than the total number of the second terminals.

16. The communication system according to claim 14, wherein
the total number of the first terminals is greater than or equal to forty-five and less than or equal to fifty-four, and
the total number of the second terminals is greater than or equal to fifty-five and less than or equal to sixty-four.

17. The communication system according to claim 1, wherein the first circuit board is a multilayer board.

18. The communication system according to claim 1, wherein
the first circuit board is an equiangular quadrilateral, and
the first circuit board has an outer shape, one side of which is greater than or equal to 4 mm and less than or equal to 6 mm.

19. The communication system according to claim 1, wherein
the plurality of electric components includes the power supply and the display device, and
power line communication is performed between the power supply and the display device.

20. A circuit module configured to be mounted on a bicycle electric component, the circuit module comprising:
a first circuit board;
a communication converter mounted on the first circuit board, the communication converter being configured to convert information communicated via one of power line communication and serial communication to information to be communicated via the other of power line communication and serial communication; and
a plurality of first terminals formed on the first circuit board, the plurality of first terminals being connected to a second circuit board included in the bicycle electric component; and
an electronic part mounted on the first circuit board and different from the communication converter, the electronic part including a filter circuit, wherein
the filter circuit removes a noise from a signal that is input to the circuit module and sends the signal, from which the noise is removed, to the communication converter.

21. A circuit module configured to be mounted on a bicycle electric component, the circuit module comprising:
a first circuit board;
a communication converter mounted on the first circuit board, the communication converter being configured to convert information communicated via one of power line communication and serial communication to information to be communicated via the other of power line communication and serial communication;
a plurality of first terminals formed on the first circuit board, the plurality of first terminals being connected to a second circuit board included in the bicycle electric component; and
a resin member that covers at least a part of the first circuit board.

22. A circuit module configured to be mounted on a bicycle electric component, the circuit module comprising:
a first circuit board;
a communication converter mounted on the first circuit board, the communication converter being configured to convert information communicated via one of power line communication and serial communication to information to be communicated via the other of power line communication and serial communication; and
a plurality of first terminals formed on the first circuit board, the plurality of first terminals being connected to a second circuit board included in the bicycle electric component, wherein
the circuit module has a thickness that is less than or equal to 1.3 mm.

23. A communication system in which power line communication is performed between a plurality of electric components mounted on a bicycle, wherein a first electric component of the plurality of electric components includes a first circuit module configured to be mounted on a bicycle electric component, the first circuit module comprising:
a first circuit board;
a communication converter mounted on the first circuit board, the communication converter being configured to convert information communicated via one of power line communication and serial communication to information to be communicated via the other of power line communication and serial communication; and a plurality of first terminals formed on the first circuit board, the plurality of first terminals being connected to a second circuit board included in the bicycle electric component, wherein the first circuit module is configured to communicate via power line communication with a second circuit module mounted on a second bicycle electric component of the plurality of electric components, at least a portion of the first circuit module and the second circuit module is substantially identical, and the plurality of electric components includes at least two of a power supply, a drive unit that assists in travel of the bicycle, an electric shifting device, an electric suspension, an electric adjustable seatpost, an electric brake, a light, and a display device.

* * * * *